United States Patent
Park et al.

(10) Patent No.: US 9,753,315 B2
(45) Date of Patent: Sep. 5, 2017

(54) LIQUID CRYSTAL DISPLAY DEVICE HAVING FIXING UNIT FOR OPTICAL SHEET

(71) Applicant: LG Display Co., Ltd., Seoul (KR)

(72) Inventors: Sang-Dae Park, Goyang-si (KR); Min-Jin Lee, Paju-si (KR); Sung-Hwan Yoon, Seoul (KR)

(73) Assignee: LG Display Co., Ltd., Seoul (KR)

(*) Notice: Subject to any disclaimer, the term of this patent is extended or adjusted under 35 U.S.C. 154(b) by 86 days.

(21) Appl. No.: 14/581,800

(22) Filed: Dec. 23, 2014

(65) Prior Publication Data
US 2016/0041419 A1   Feb. 11, 2016

(30) Foreign Application Priority Data
Aug. 8, 2014   (KR) .................. 10-2014-0102553

(51) Int. Cl.
*G02F 1/1333*   (2006.01)
(52) U.S. Cl.
CPC .................. *G02F 1/133308* (2013.01); *G02F 2001/133314* (2013.01); *G02F 2201/465* (2013.01)
(58) Field of Classification Search
CPC ............ G02F 1/133308; G02F 1/1336; G02F 1/133524; G02F 1/133553; G02F 1/133504; G02F 2001/133314; G02F 2201/465
USPC .................................................... 349/58–60
See application file for complete search history.

(56) References Cited

U.S. PATENT DOCUMENTS

| 6,175,396 B1* | 1/2001 | Kim ................ G02F 1/133308 349/58 |
| 2010/0079699 A1* | 4/2010 | Cho ................ G02F 1/133608 349/61 |
| 2010/0328927 A1* | 12/2010 | Huang ............. G02F 1/133606 362/97.1 |
| 2015/0078032 A1* | 3/2015 | Horiguchi ........ G02F 1/133308 362/607 |
| 2015/0219318 A1* | 8/2015 | Chae ............... G02F 1/133308 349/58 |
| 2015/0293290 A1* | 10/2015 | Ogino ................ H04N 5/66 348/791 |
| 2016/0011364 A1* | 1/2016 | Horiguchi ........ G02F 1/133606 362/606 |

FOREIGN PATENT DOCUMENTS

KR   10-2013-0017868 A   2/2013

* cited by examiner

*Primary Examiner* — Charles Chang
(74) *Attorney, Agent, or Firm* — Fenwick & West LLP (57) ABSTRACT

A liquid crystal display device includes a liquid crystal display panel; a backlight assembly providing light to the liquid crystal display panel and including an optical sheet; a bottom cover supporting the liquid crystal display panel and the backlight assembly and including a side surface having an indented portion; and a fixing unit combined with the indented portion of the side surface of the bottom cover to fix the optical sheet, wherein the optical sheet includes a projecting portion, which is cut to include a fixing part and bridges and is united with the fixing unit.

17 Claims, 6 Drawing Sheets

FIG. 1

Related Art

LIQUID CRYSTAL DISPLAY DEVICE HAVING FIXING UNIT FOR OPTICAL SHEET

CROSS-REFERENCE TO RELATED APPLICATION

The present application claims the priority to Korean Patent Application No. 10-2014-0102553 filed in the Republic of Korea on Aug. 8, 2014, which is hereby incorporated by reference in their entirety.

BACKGROUND

Field of the Disclosure

The present disclosure relates to a liquid crystal display device, and more particularly, to a liquid crystal display device having a fixing unit for an optical sheet.

Discussion of the Related Art

Nowadays, liquid crystal display devices have widely been used as image display devices. A liquid crystal display device displays an image by controlling transmittance of light using liquid crystal, which has optical anisotropy.

A liquid crystal display device includes a liquid crystal display panel producing an image and frames supporting the liquid crystal display panel. Since the liquid crystal display device is not self-luminous, the liquid crystal display device further includes a backlight assembly providing light to the liquid crystal display panel.

More particularly, the liquid crystal display device includes a liquid crystal display panel producing an image, a backlight assembly providing light to the liquid crystal display panel, a guide panel supporting the liquid crystal display panel and the backlight assembly, and a bottom cover installed under and supporting the liquid crystal display panel and combined with the guide panel.

The backlight assembly includes a light guide plate between the liquid crystal display panel and the bottom cover to guide light from a light source of the backlight assembly toward the liquid crystal display panel. The light guide plate is implemented for an edge type backlight assembly, in which the light source is disposed at a side of the liquid crystal display panel.

The backlight assembly further includes optical sheets of a diffusion sheet, a prism sheet, and a protection sheet. The diffusion sheet uniformly diffuses light from the light guide plate, the prism sheet collimates light from the diffusion sheet, and the protection sheet protects the diffusion sheet and the prism sheet from scratches.

The optical sheets may be fixed by combination of the guide panel and the bottom cover and may be fixed to the guide panel by a fixing mean such as a fixing pad, for example.

Figure 1:
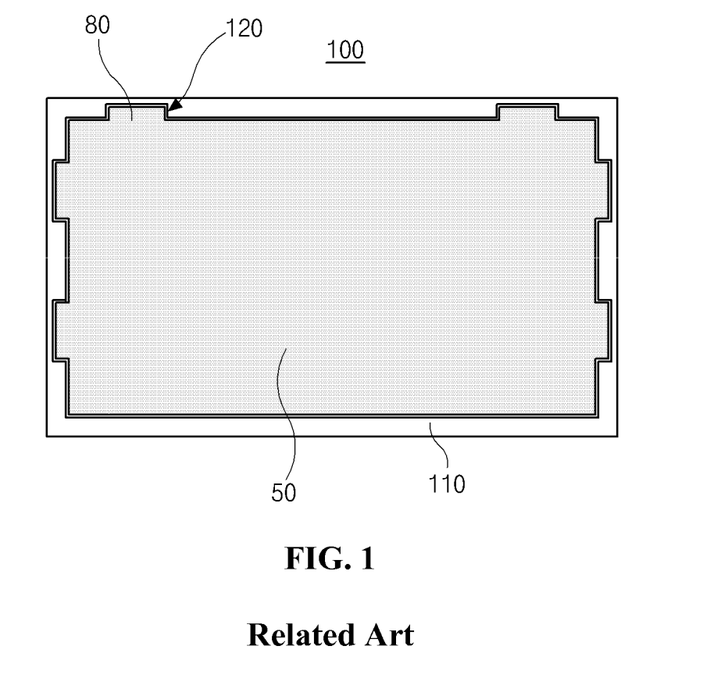
FIG. 1 is a view of illustrating an optical sheet fixed to a bottom cover according to the related art.

FIG. 1 is a view of illustrating an optical sheet fixed to a bottom cover according to the related art.

In FIG. 1, the optical sheet 50 includes projecting portions 80, and the bottom cover 110 includes grooves 120 at its side surfaces. The grooves 120 of the bottom cover 110 are combined with the projecting portions 80 of the optical sheet 50 to fix the optical sheet 50.

The optical sheet 50 uniformly provides light to a liquid crystal display panel (not shown). If there are wrinkles or folds in the optical sheet 50, the optical sheet 50 does not function normally, and the image qualities of a display device are lowered.

A decrease in a width of a non-display area outside a display area is desired in order to implement a narrow bezel together with a thin profile and light weight.

SUMMARY OF THE INVENTION

Accordingly, the present invention is directed to a liquid crystal display device having a fixing unit for an optical sheet that substantially obviates one or more of the problems due to limitations and disadvantages of the related art.

An object of the present disclosure is to provide a liquid crystal display device having a fixing unit for an optical sheet that has a narrow bezel.

Another object of the present disclosure is to provide a liquid crystal display device having a fixing unit for an optical sheet that easily fixes the optical sheet and provides uniform light from the optical sheet to a liquid crystal display panel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a liquid crystal display device including a liquid crystal display panel; a backlight assembly providing light to the liquid crystal display panel and including an optical sheet; a bottom cover supporting the liquid crystal display panel and the backlight assembly and including a side surface having an indented portion; and a fixing unit combined with the indented portion of the side surface of the bottom cover to fix the optical sheet, wherein the optical sheet includes a projecting portion, which is cut to include a fixing part and bridges and is united with the fixing unit.

In another aspect, a liquid crystal display device includes a liquid crystal display panel; a backlight assembly providing light to the liquid crystal display panel and including an optical sheet; and a bottom cover supporting the liquid crystal display panel and the backlight assembly and including a side surface having a hook, wherein the optical sheet includes a projecting portion, which is cut to include a fixing hole combined with the hook and bridges and is united with the bottom cover.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

First Embodiment

Figure 2:
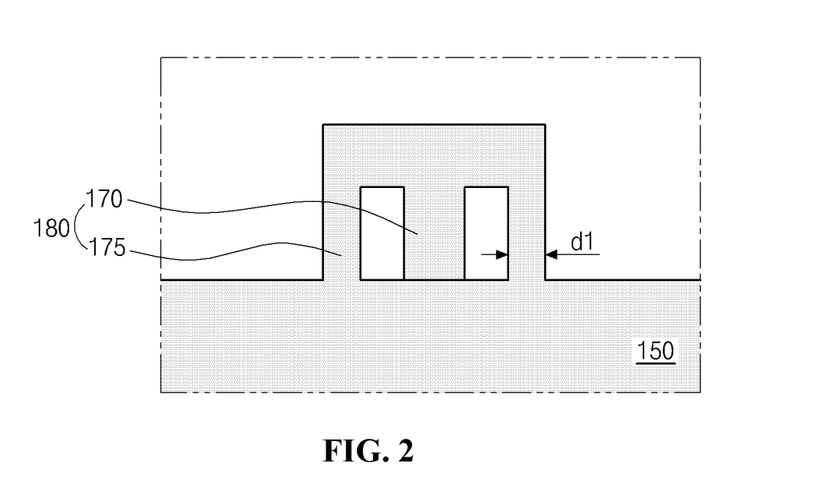
FIG. 2 is a view of illustrating part of an optical sheet according to a first embodiment of the present invention.
Figure 3:
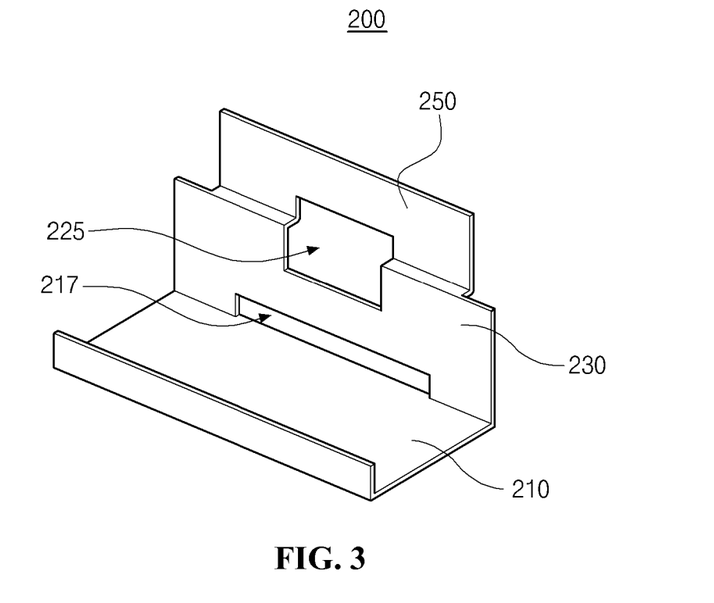
FIG. 3 is a perspective view of illustrating a fixing unit for an optical sheet according to the first embodiment of the present invention.

FIG. 2 is a view of illustrating part of an optical sheet according to a first embodiment of the present invention, and FIG. 3 is a perspective view of illustrating a fixing unit for an optical sheet according to the first embodiment of the present invention. FIG. 2 shows a projecting portion of the optical sheet.

Figure 4A:
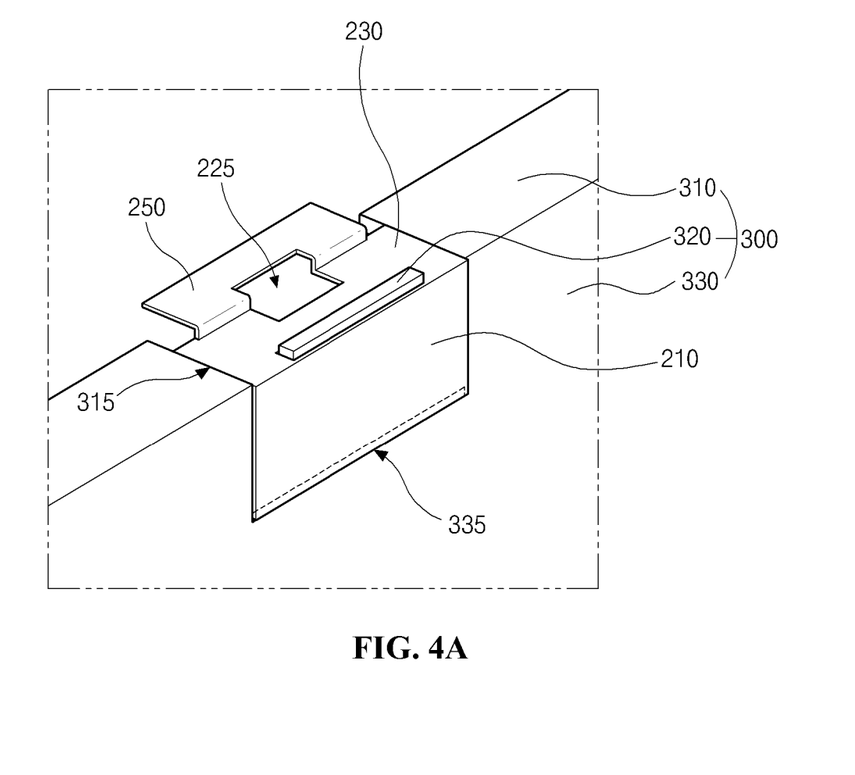
FIG. 4A is a perspective view of illustrating the fixing unit combined with the bottom cover according to the first embodiment of the present invention.

In FIG. 2 and FIG. 3, the projecting portion 180 of the optical sheet 150 is cut to include a fixing part 170 and bridges 175. The fixing part 170 is combined with a third hole 225 of the fixing unit 200, and the bridges 175 are folded when a bottom cover 300 of FIG. 4A is combined with a guide panel (not shown). Here, the bottom cover 300 of FIG. 4A may be referred to as a cover bottom.

The projecting portion 180 protrudes from a body of the optical sheet 150 along a first direction. The fixing part 170 may be disposed between the bridges 175 along a second direction perpendicular to the first direction, and there may be a gap between the fixing part 170 and each of the bridges 175. Each of the fixing part 170 and the bridges 175 has a first end adjacent to the body of the optical sheet 150 and a second end opposite to the first end. The first end of the fixing part 170 is separated from the body of the optical sheet 150. The first end of the fixing part 170 may be spaced apart from the body of the optical sheet 150. The first ends of the bridges 175 are connected to the body of the optical sheet 150. The second ends of the fixing part 170 and the bridges 175 are connected to each other.

The bridges 175 may be folded when the guide panel is combined with a liquid crystal display panel (not shown) such that the guide panel surrounds sides of the liquid crystal display panel.

In one example, a width d1 of each of the bridges 175, is less than 2 mm such that the bridges 175 are naturally folded when the guide panel is combined with the liquid crystal display panel.

The fixing unit 200 for fixing the optical sheet 150 according to the first embodiment of the present invention includes first, second and third surfaces 210, 230 and 250. The first surface 210 corresponds to a bottom surface 330 of FIG. 4A of the bottom cover 300 of FIG. 4A, and the second and third surfaces 230 and 250 correspond to a side surface 310 of FIG. 4A of the bottom cover 300 of FIG. 4A. The second surface 230 is disposed between the first and third surfaces 210 and 250 and is connected to the first and third surfaces 210 and 250.

Here, the first surface 210 may have a predetermined angle with respect to the second and third surfaces 230 and 250. The predetermined angle may be 90 degrees. The second and third surfaces 230 and 250 may be parallel to each other.

Figure 4B:
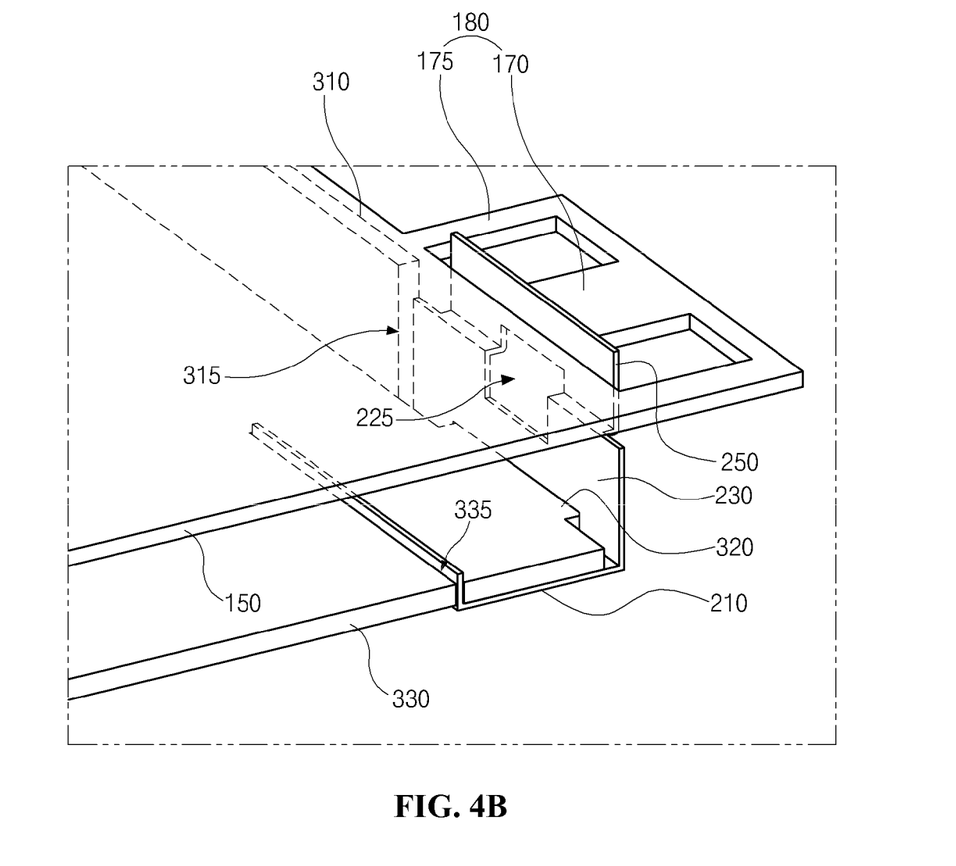
FIG. 4B is a perspective view of illustrating the projecting portion of the optical sheet disposed over the fixing unit according to the first embodiment of the present invention.

In addition, a first end of the first surface 210 is connected to the second surface 230, and a second end of the first surface 210 is bent upward to be combined with a first hole 335 of FIG. 4B. The bent portion of the first surface 210 may be an inserting part, which may be parallel to the second surface 230 and may be inserted in the first hole 335 of FIG. 4B.

The third surface 250 has a narrower width than the second surface 230, and the bridges 175 are disposed between the second surface 230 and the third surface 250. The second surface 230 has a second hole 217 to be combined with a protrusion 320 of FIG. 4A, and the second and third surfaces 230 and 250 have a third hole 225 to be combined with the fixing part 170.

Meanwhile, referring to FIG. 4A, the bottom surface 330 of FIG. 4A of the bottom cover 300 of FIG. 4A has the first hole 335 of FIG. 4A, and the side surface 310 of FIG. 4A of the bottom cover 300 of FIG. 4A has a portion 315 that is indented. In addition, the bottom surface 330 of FIG. 4A has a protrusion 320 of FIG. 4A that is formed in the indented portion 315 of the bottom cover 300.

In addition, a hemming treatment is performed between the second and third surfaces 230 and 250, and the optical sheet 150 is prevented from being torn when the optical sheet 150 is fixed to the fixing unit 200. That is, a connecting surface, which is parallel to the first surface 210, may be disposed between the second and third surfaces 230 and 250 to connect the second and third surfaces 230 and 250. The third surface 250 may not be disposed on the same plane as the second surface 230.

Figure 4C:
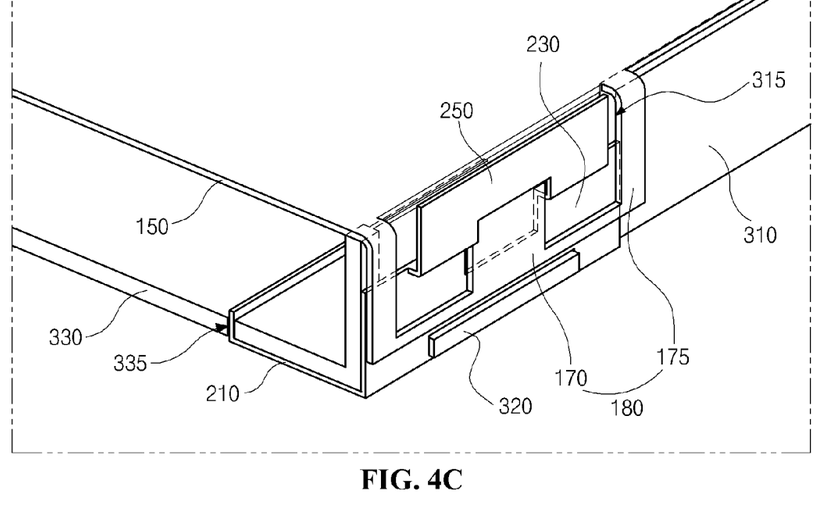
FIG. 4C is a perspective view of illustrating the optical sheet fixed to the fixing unit by folding the projecting portion according to the first embodiment of the present invention.

FIG. 4A is a perspective view of illustrating the fixing unit 200 combined with the bottom cover 300 according to the first embodiment of the present invention, FIG. 4B is a perspective view of illustrating the projecting portion 180 of the optical sheet 150 disposed over the fixing unit 200 according to the first embodiment of the present invention, and FIG. 4C is a perspective view of illustrating the optical sheet 150 fixed to the fixing unit 200 by folding the projecting portion 180 according to the first embodiment of the present invention.

A liquid crystal display device according to the first embodiment of the present invention includes the liquid crystal display panel (not shown), a backlight assembly (not shown) providing light to the liquid crystal display panel, the bottom cover 300 supporting the liquid crystal display panel and the backlight assembly, the guide panel (not shown) combined with sides of the liquid crystal display panel and the bottom cover 300, surrounding sides of the liquid crystal display panel and the backlight assembly and supporting the liquid crystal display panel, and the fixing unit 200 combined with the indented portion 315 of the bottom cover 300 and fixing the optical sheet 150 of the backlight assembly.

Although not shown in the figures, the liquid crystal display panel includes first and second substrates and a liquid crystal layer interposed between the first and second substrates. Gate and data lines are formed on an inner surface of the first substrate, thin film transistors are connected to the gate and data lines, and pixel electrodes are connected to the thin film transistors. A black matrix and a color filter layer are formed on an inner surface of the second substrate. The color filter layer includes red, green and blue color filter patterns. Alternatively, the black matrix and the color filter layer may be formed over the first substrate. A common electrode is formed over the first substrate or the second substrate.

Moreover, the backlight assembly includes a light source, a reflection sheet, and the optical sheet 150, and the optical sheet 150 is disposed between the reflection sheet and the liquid crystal display panel. The optical sheet 150 may include a plurality of sheets. The backlight assembly may further include a light guide plate between the reflection sheet and the optical sheet 150. The backlight assembly may further include a diffusion plate between the light guide plate and the optical sheet 150.

The optical sheet 150 has at least one projecting portion 180. The projecting portion 180 is cut and includes the fixing part 170 and the bridges 175 to be fixed to the fixing unit 200.

First, in FIG. 4A, the side surface 310 of the bottom cover 300 has the indented portion 315, and the bottom surface 330 of the bottom cover 300 has the protrusion 320 formed in the indented portion 315 of the side surface 330. The protrusion 320 is combined with the second hole 217 of the fixing unit 200. The bottom surface 330 of the bottom cover 300 also has the first hole 335 combined with the bent portion of the first surface 210 of the fixing unit 200, that is, the inserting part.

Therefore, the fixing unit 200 is fixed to the indented portion 315 of the side surface 310 of the bottom cover 300. Namely, the second surface 230 of the fixing unit 200 may have substantially the same width as the indented portion 315 of the side surface 310 of the bottom cover 300, and the third surface 250 of the fixing unit 200 may have substantially a narrower width than the indented portion 315 of the side surface 310 of the bottom cover 300. Thus, the second and third surfaces 230 and 250 of the fixing unit 200 may be fit to the indented portion 315 of the side surface 310 of the bottom cover 300. In addition, the protrusion 320 of the bottom surface 330 of the bottom cover 300 is combined with and inserted in the second hole 217 of the fixing unit 200, and the bent portion of the first surface 210 of the fixing unit 200 is combined with and inserted in the first hole 335 of the bottom surface 330 of the bottom cover 300.

Next, in FIG. 4B, when the projecting portion 180 of the optical sheet 150 including the fixing part 170 and the bridges 175 is fixed to the fixing unit 200, the fixing part 170 is caught by the third hole 225 of the fixing unit 200.

In one example, a width of the fixing part 170, may be narrower than a width of the third hole 225 of the fixing unit 200.

Next, in FIG. 4C, when the guide panel (not shown) is combined with the sides of the liquid crystal display panel and the bottom cover 300, the bridges 175 are naturally folded with the fixing part 170 caught by the third hole 225 of the fixing unit 200.

At this time, to naturally fold the bridges 175, it is desirable that each of the bridges 175 has a width of less than 2 mm.

In one embodiment, as a size of the optical sheet 150 increases, a size of the projecting portion 180 increases, and the width of the bridges 175 also increases.

In this case, although the width of each of the bridges 175 is more than 2 mm, the bridges 175 may be naturally folded when the guide panel is combined with the sides of the liquid crystal display panel and the bottom cover 300.

Like this, by folding the projecting portion 180 of the optical sheet 150, the liquid crystal display device including the fixing unit 200 according to the first embodiment of the present invention may have a relatively narrow bezel.

Moreover, for fixing a plurality of optical sheets 150, since the projecting portion 180 has the bridges 175 with the narrow width of less than 2 mm, the projecting portion 180 is naturally folded when the liquid crystal display panel, the bottom cover 300 and the guide panel are combined with each other. Therefore, physical loads are not applied to the optical sheets 150, and the optical sheets 150 are easily fixed to fixing unit 200.

Furthermore, because the fixing unit 200 has a simple structure, manufacturing costs for the fixing unit 200 are relatively low. Since the process of combining the optical sheets 150 is simplified, manufacturing time decreases, and productivity increases.

Second Embodiment

Figure 5:
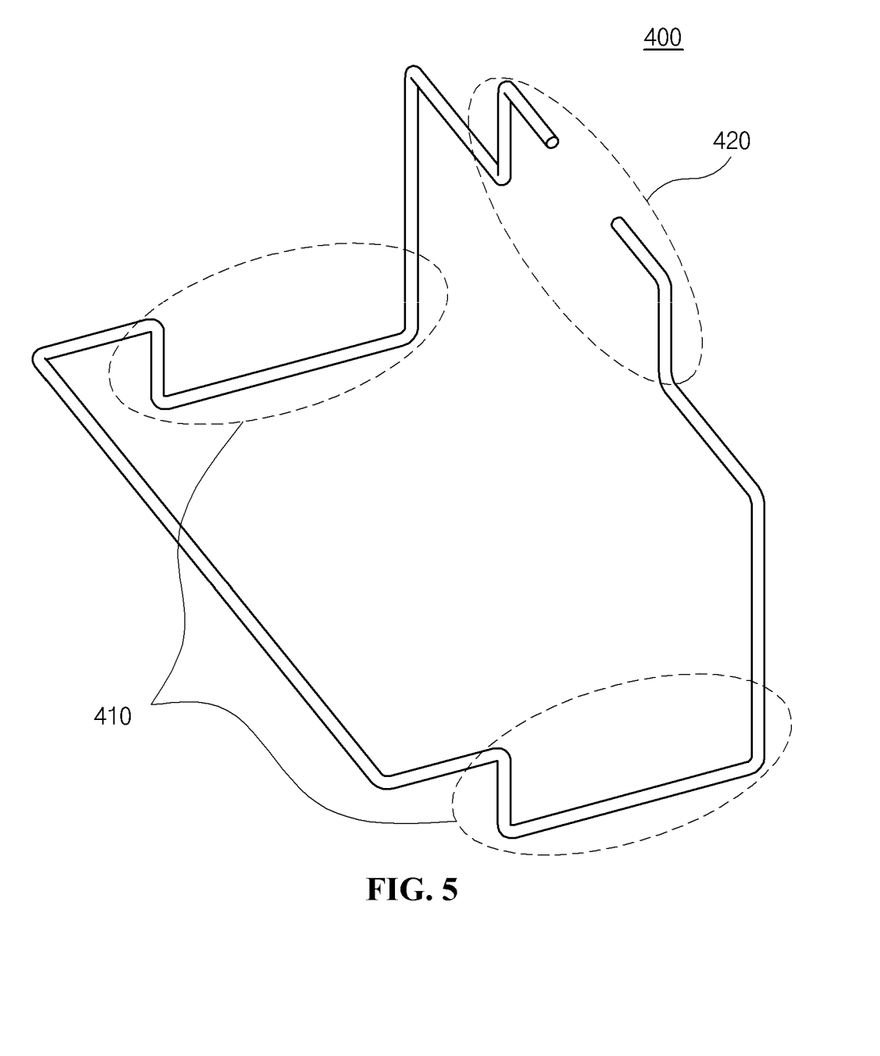
FIG. 5 is a perspective view of illustrating a fixing unit for an optical sheet according to a second embodiment of the present invention.

FIG. 5 is a perspective view of illustrating a fixing unit for an optical sheet according to a second embodiment of the present invention. A projecting portion of the optical sheet according to the second embodiment has the same structure as that of the first embodiment of FIG. 2.

In FIG. 2 and FIG. 5, the projecting portion 180 of the optical sheet 150 is cut and includes a fixing part 170 and bridges 175. The fixing part 170 is combined with a fastening part 420 of the fixing unit 400, and the bridges 175 are folded when a bottom cover 300 of FIG. 4A is combined with a guide panel (not shown). Here, the bottom cover 300 of FIG. 4A may be referred to as a cover bottom.

The bridges 175 may be folded when the guide panel is combined with a liquid crystal display panel (not shown) such that the guide panel surrounds sides of the liquid crystal display panel.

In one example, a width d1 of each of the bridges 175 is less than 2 mm such that the bridges 175 are naturally folded when the guide panel is combined with the liquid crystal display panel.

The fixing unit 400 for fixing the optical sheet 150 according to the second embodiment of the present invention has a line shape. The fixing unit 400 is formed of an elastic material and is bent to include connecting parts 410 and the fastening part 420. The connecting parts 410 are combined with a bottom surface 330 of FIG. 4A of the bottom cover 300 of FIG. 4A. The fastening part 420 corresponds to a side surface 310 of FIG. 4A of the bottom cover 300 of FIG. 4A, and the fixing part 170 of the optical sheet 150 is caught by the fastening part 420.

The connecting parts 410 are combined with holes (not shown) of the bottom surface 330 of FIG. 4A of the bottom cover 300 of FIG. 4A. Although there are two connecting parts 410 in the figure, the bottom cover 300 of FIG. 4A may be combined with the fixing unit 400 using a connecting part or more.

First, the fixing unit 400 is combined with the bottom cover 300 of FIG. 4A, and the fixing part 170 of the optical sheet 150 is caught by the fastening part 420 of the fixing unit 400.

Then, when the guide panel supporting the liquid crystal display panel is combined with the sides of the liquid crystal display panel and the bottom cover 300 of FIG. 4A, the bridges 175 of the optical sheet 150 is naturally folded.

In addition, the fixing part 170 of the optical sheet 150 is combined with the fastening part 420, and the fastening part 420 is divided into two pieces spaced apart from each other to increase elasticity of the fixing unit 400. Accordingly, when the guide panel is combined with the liquid crystal display panel and the bottom cover 300 of FIG. 4A, an effect by pressure may be minimized.

The fixing part 170 may be embodied as a spring. Since the spring is very thin, the spring is relatively easy to make a shape of the fixing unit 400 and to implement a narrow bezel. Because the spring is relatively cheap, manufacturing costs decrease.

Furthermore, similarly to the liquid crystal display device according to the first embodiment of the present invention, for fixing a plurality of optical sheets 150, since the projecting portion 180 has the bridges 175 with the narrow width of less than 2 mm, the projecting portion 180 is naturally folded when the liquid crystal display panel, the bottom cover 300 and the guide panel are combined with each other. Therefore, physical loads are not applied to the optical sheets 150, and the optical sheets 150 are easily fixed to the fixing unit 400.

Third Embodiment

Figure 6:
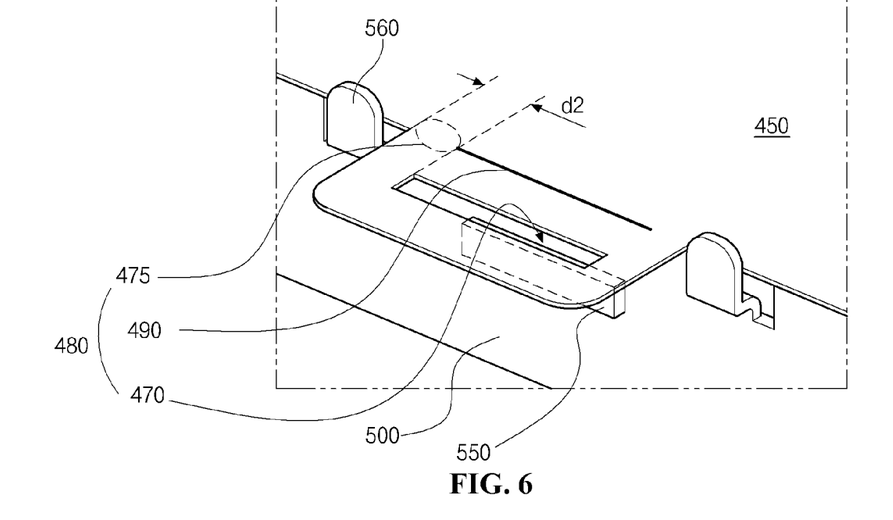
FIG. 6 is a perspective view of illustrating a projecting portion of an optical sheet disposed over a bottom cover according to a third embodiment of the present invention.
Figure 7:
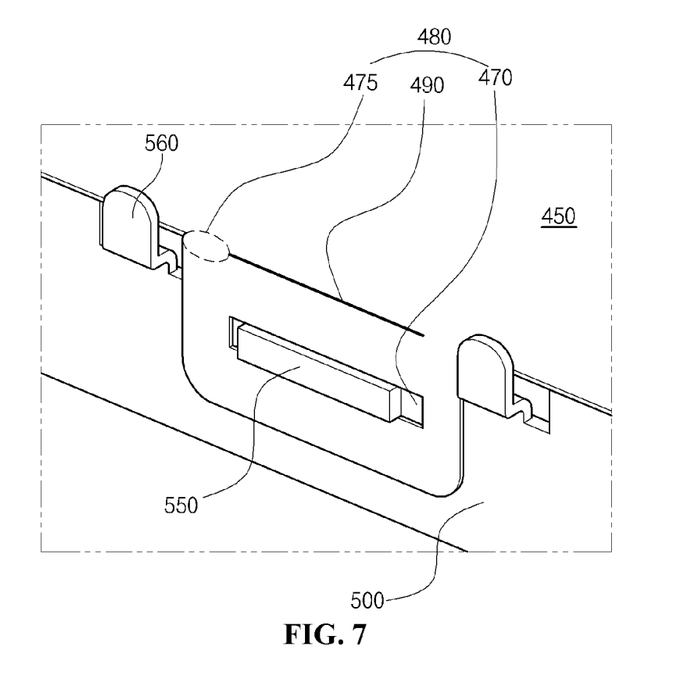
FIG. 7 is a perspective view of illustrating the projecting portion of the optical sheet folded and fixed to a hook of the bottom cover according to the third embodiment of the present invention.

FIG. 6 is a perspective view of illustrating a projecting portion of an optical sheet disposed over a bottom cover according to a third embodiment of the present invention, and FIG. 7 is a perspective view of illustrating the projecting portion of the optical sheet folded and fixed to a hook of the bottom cover according to the third embodiment of the present invention.

In FIG. 6 and FIG. 7, a liquid crystal display device according to the third embodiment of the present invention includes a liquid crystal display panel (not shown), a backlight assembly (not shown) providing light to the liquid crystal display panel, a bottom cover 500 supporting the liquid crystal display panel and the backlight assembly, and a guide panel (not shown) combined with sides of the liquid crystal display panel and the bottom cover 500, surrounding sides of the liquid crystal display panel and the backlight assembly and supporting the liquid crystal display panel.

Although not shown in the figures, the liquid crystal display panel includes first and second substrates and a liquid crystal layer interposed between the first and second substrates. Gate and data lines are formed on an inner surface of the first substrate, thin film transistors are connected to the gate and data lines, and pixel electrodes are connected to the thin film transistors. A black matrix and a color filter layer are formed on an inner surface of the second substrate. The color filter layer includes red, green and blue color filter patterns. Alternatively, the black matrix and the color filter layer may be formed over the first substrate. A common electrode is formed over the first substrate or the second substrate.

Moreover, the backlight assembly includes a light source, a reflection sheet, and an optical sheet 450, and the optical sheet 450 is disposed between the reflection sheet and the liquid crystal display panel. The optical sheet 450 may include a plurality of sheets. The backlight assembly may further include a light guide plate between the reflection sheet and the optical sheet 450. The backlight assembly may further include a diffusion plate between the light guide plate and the optical sheet 450.

The bottom cover 500 includes interlocking parts 560, which are united to holes (not shown) of the guide panel when the guide panel is combined with sides of the bottom cover 500.

The optical sheet 450 includes at least one projecting portion 480, and the projecting portion 480 is cut to include a fixing hole 470 and bridges 475. The fixing hole 470 is united to a hook 550 of the bottom cover 500, and the bridges 475 are folded when the guide panel is combined with the sides of the liquid crystal display panel and the bottom cover 500. At this time, a folding line 490 may be formed in the projecting portion 480 of the optical sheet 450 by cutting the projecting portion 480 along a direction parallel to a length of the fixing hole 470.

When the optical sheet 450 is combined with the bottom cover 500, the projecting portion 480 protrudes outwards from a side surface of the bottom cover 500. Then, when the guide panel is combined with the sides of the liquid crystal display panel and the bottom cover 500, the bridges 475 are folded, and the hook 550 is united to the fixing hole 470. That is, the hook 550 is inserted in the fixing hole 470.

In one example, when the guide panel is combined with the sides of the liquid crystal display panel and the bottom cover 500, a width d2 of each of the bridges 475, is less than 2 mm such that the bridges 475 are naturally folded.

In one embodiment, as a size of the optical sheet 450 increases, a size of the projecting portion 480 increases, and the width d2 of the bridges 475 also increases.

In this case, although the width d2 of each of the bridges 475 is more than 2 mm, the bridges 475 may be naturally folded when the guide panel is combined with the sides of the liquid crystal display panel and the bottom cover 300.

In the optical sheet 450 according to the third embodiment of the present invention, the bridges 475 are formed by cutting the projecting portion 480 along a straight line. Therefore, it is simple to cut the projecting portion 480 and easy to form the bridges 475, each of the bridges 475 having the width d2 of less than 2 mm.

Additionally, when the optical sheet 450 is disposed over the bottom cover 500, the projecting portion 480 protrudes outwards from the side surface of the bottom cover 500 with respect to the folding line 490. Then, when the guide panel is combined with the sides of the liquid crystal display panel and the bottom cover 500, the bridges 475 are folded.

Accordingly, by folding the projecting portion 480 of the optical sheet 450, the liquid crystal display device according to the third embodiment of the present invention may have a relatively narrow bezel.

Moreover, for fixing a plurality of optical sheets 450, since the projecting portion 480 has the bridges 475 with the narrow width d2 of less than 2 mm, the projecting portion 480 is naturally folded when the liquid crystal display panel, the bottom cover 500 and the guide panel are combined with each other. Therefore, physical loads are not applied to the optical sheets 450, and the optical sheets 450 are easily fixed to bottom cover 500.

It will be apparent to those skilled in the art that various modifications and variations can be made in a display device of the present disclosure without departing from the sprit or scope of the invention. Thus, it is intended that the present invention covers the modifications and variations of this invention provided they come within the scope of the appended claims and their equivalents.

What is claimed is:

1. A liquid crystal display device comprising:
a liquid crystal display panel;
a backlight assembly providing light to the liquid crystal display panel and including an optical sheet, the optical sheet comprising a planar surface facing the liquid crystal display panel in a first direction and a projecting portion coupled to the planar surface, the projecting portion being bent to face in a second direction, the projecting portion comprising:
an elongated part with a surface facing in the second direction,
bridges each coupled between the planar surface and the elongated part, and
a fixing part coupled to the elongated part between the bridges;
a bottom cover supporting the liquid crystal display panel and the backlight assembly, the bottom cover including a side surface having an indented portion, the side surface facing in the second direction; and
a fixing unit coupled to the indented portion of the side surface of the bottom cover, the fixing part of the projection portion secured to the fixing unit.

2. The display device of claim 1, wherein the bottom cover includes a bottom surface facing the liquid crystal display panel in the first direction, the bottom surface having a first hole and a protrusion towards the second direction formed in the indented portion of the side surface,
wherein the fixing unit includes (i) a first surface facing the bottom surface in the first direction, (ii) a second surface and (iii) a third surface, the second surface and the third surface facing in the second direction, the third surface offset from the second surface in the second direction,
wherein the second surface is disposed at a first end of the first surface, and a second end of the first surface is bent towards the liquid crystal display panel in the first direction and inserted into the first hole of the bottom surface, and
wherein the second surface has a second hole through which the protrusion of the bottom surface is inserted, and the second surface and the third surface together have a third hole at which the fixing part of the projecting portion is secured.

3. The display device of claim 2, wherein a hemming treatment is performed between the second surface and the third surface.

4. The display device of claim 1, wherein each of the bridges has a width of less than 2 mm.

5. The display device of claim 1, wherein the fixing unit has a line shape and includes an elastic material, and the fixing unit is bent to include a connecting part and a fastening part,
wherein the connecting part is coupled to a bottom surface of the bottom cover, the bottom surface facing the liquid crystal display panel in the first direction, and
wherein the fastening part corresponds to the side surface of the bottom cover and the fixing part is secured to the fastening part.

6. The display device of claim 5, wherein the fastening part is divided into two pieces spaced apart from each other.

7. The display device of claim 1, wherein the fixing unit includes more than two connecting parts.

8. A liquid crystal display device comprising:
a liquid crystal display panel;
a backlight assembly providing light to the liquid crystal display panel and including an optical sheet comprising a first surface facing the liquid crystal display panel in a first direction and a projecting portion coupled to the first surface, the projecting portion being bent to face in a second direction, the projecting portion comprising:
an elongated part with a second surface facing in the second direction, and
bridges each coupled between the first surface and the elongated part; and
a bottom cover including a side surface facing in the second direction and supporting the liquid crystal display panel and the backlight assembly.

9. The display device of claim 8, wherein each of the bridges has a width of less than 2 mm.

10. The display device of claim 8, wherein the projecting portion further includes a fixing part coupled to the elongated part between the bridges.

11. The display device of claim 10, further comprising a fixing unit coupled to an indented portion of the side surface of the bottom cover, the fixing part secured to the fixing unit.

12. The display device of claim 11, wherein the bottom cover includes a bottom surface facing the liquid crystal display panel in the first direction, the bottom surface having a first hole and a protrusion towards the second direction formed in the indented portion of the side surface.

13. The display device of claim 12, wherein the fixing unit includes (i) a first surface facing the bottom surface in the first direction (ii) a second surface and (iii) a third surface, the second surface and the third surface facing in the second direction, the third surface offset from the second surface in the second direction,
wherein the second surface is disposed at a first end of the first surface, and a second end of the first surface is bent towards the first direction and inserted into the first hole of the bottom surface, and
wherein the second surface has a second hole through which the protrusion of the bottom surface is inserted, and the second surface and the third surface together have a third hole at which the fixing part of the projecting portion is secured.

14. The display device of claim 11, wherein the fixing unit has a line shape and includes an elastic material, and the fixing unit is bent to include a connecting part and a fastening part,
wherein the connecting part is coupled to a bottom surface of the bottom cover, the bottom surface facing the liquid crystal display panel in the first direction, and
wherein the fastening part corresponds to the side surface of the bottom cover and the fixing part is secured to the fastening part.

15. The display device of claim 14, wherein the fastening part is divided into two pieces spaced apart from each other.

16. The display device of claim 8, wherein the side surface has a hook, and the projecting portion includes a fixing hole combined with the hook.

17. The display device of claim 16, wherein the projecting portion further includes a folding line along a direction parallel to a length of the fixing hole.

* * * * *